(12) United States Patent  (10) Patent No.: US 7,926,847 B2
Auer et al.  (45) Date of Patent: Apr. 19, 2011

(54) DEFLECTOR DEVICE FOR PARTIALLY OVERLAPPING FRONTAL COLLISION OF MOTOR VEHICLES

(75) Inventors: Thomas Auer, Haar (DE); Wolfgang Schimpl, Grieskirchen (AT); Adolf Ornig, Unterpremstetten (AT)

(73) Assignee: MAGNA STEYR Fahrzeugtechnik AG & Co. KG, Graz (AT)

( * ) Notice: Subject to any disclaimer, the term of this patent is extended or adjusted under 35 U.S.C. 154(b) by 148 days.

(21) Appl. No.: 12/281,954

(22) PCT Filed: Mar. 6, 2007

(86) PCT No.: PCT/AT2007/000112
§ 371 (c)(1),
(2), (4) Date: Mar. 5, 2009

(87) PCT Pub. No.: WO2007/101285
PCT Pub. Date: Sep. 13, 2007

(65) Prior Publication Data
US 2009/0302591 A1 Dec. 10, 2009

(30) Foreign Application Priority Data
Mar. 6, 2006 (AT) ............................. GM165/2006 U

(51) Int. Cl.
*B62D 7/22* (2006.01)

(52) U.S. Cl. .......................... 280/784; 293/114; 293/150
(58) Field of Classification Search .................. 280/784; 293/150, 114
See application file for complete search history.

(56) References Cited

U.S. PATENT DOCUMENTS
5,042,858 A 8/1991 Schubert et al.
2008/0023954 A1 1/2008 Eichberger et al.

FOREIGN PATENT DOCUMENTS
DE 195 32 858 A1 2/1997
JP 2004306871 A 11/2004

*Primary Examiner* — Eric Culbreth
(74) *Attorney, Agent, or Firm* — Bachman & LaPointe, P.C.

(57) ABSTRACT

A deflector device for motor vehicles, the front part of the chassis which comprises a left-hand and right-hand longitudinal beam, arranged before a front wheel and configured by a deflector that projects from the longitudinal beam in a substantially horizontal manner and backward at an angle to protect said front wheel in the case of a collision. The deflector device prevents the vehicles from being caught and being pushed off the road in the event of a partially overlapping frontal collision. The deflector device comprises a deflection element which can be longitudinally displaced from a rest position to an operational position, said deflection element consisting of a slider guided on or in the deflector and a forward-facing shoulder.

14 Claims, 4 Drawing Sheets a)

b)

c)

DEFLECTOR DEVICE FOR PARTIALLY OVERLAPPING FRONTAL COLLISION OF MOTOR VEHICLES

BACKGROUND OF THE INVENTION

The invention relates to a deflector device for partially overlapping frontal collision of motor vehicles, the front part of the chassis of which comprises beams, which deflector device is arranged in front of a front wheel and is formed by a deflector that is connected to a beam and projects in a substantially horizontal manner and backward at an angle to protect said front wheel in the case of a collision. A partially overlapping frontal collision is to be understood as meaning a frontal collision in which the colliding vehicles are moving toward each other with substantially parallel but laterally offset directional vectors. The collision zone is consequently only a lateral part of the front part of the chassis. The beam is generally a longitudinal beam, either of the vehicle frame or of the vehicle body or of an auxiliary frame, but it could also be a transverse beam.

The lateral part of the front part of the chassis of vehicles is usually less stiff than the middle part in front of the passenger cell and also absorbs less collision energy, so that more collision energy acts on the passenger cell. There is, in particular, the risk of the respective wheel penetrating into the passenger compartment. In addition, in cases of such collisions there is generally also a particularly dangerous phenomenon: even when there is only relatively little overlap, the front wheels on the collision side of the two vehicles become caught in one another; one wheel at least of one vehicle collides with the wheel suspension of the other and vice versa. As a result, not only do particularly strong longitudinal forces act on the colliding vehicles and on their wheels, pushing them into the passenger compartment, but the two vehicles become at least partially interlocked. As a result, they are prevented from sliding past one another. In addition, a twist about the vertical axis is also imparted jointly to the two hooked-together vehicles, throwing the vehicles involved in the collision from the roadway.

This phenomenon is indeed referred to in the literature as "hooking". A countermeasure known from DE 195 32 858 A1 is to make the front bumper extremely rounded, in plan view, and stiff in the side region in such a way as to prevent the front wheels on the collision side from touching and to make the two vehicles slide past one another. It can be imagined that, given the collision speeds that occur today, the bumper can never be strong enough. What is more, the bumper also has to meet other safety requirements that are contrary to this: a collision area that is as wide as possible in the event of an entirely overlapping frontal collision and gradual yielding in the event of collision with a pedestrian.

WO 2005/110815 A1 discloses a deflector device which, thanks to its kinematics, reaches around and pivots in the front wheel located behind it and also pivots in the colliding front wheel of the other vehicle involved in the collision. This counteracts hooking. However, tests have shown that, because of the greater forces in cases of higher collision speeds and on account of design requirements of the respective vehicle, considerable improvements of the collision behavior are still possible.

It is the object of the invention to provide a deflector element which prevents collision.

SUMMARY OF THE INVENTION

The foregoing object is achieved by the present invention wherein a deflector has a deflection element guided on it longitudinally displaceably from a rest position to an operational position, the deflection element comprising a slider, guided on or in the deflector, and a part protruding forward from said slider. In this case, the rest position is to be understood as meaning the collision-free state and the operational position is to be understood as meaning the fully displaced-out position of the deflection element in the case of a collision. The fact that the deflector projects backward at an angle from the beam (generally the longitudinal beam) means that, at the beginning of the collision, the deflection element is pushed out beyond the contour of the front wheel located behind it. The forward projecting part ensures that this happens as long as the deflector is still not deformed. On the deformed deflector, the deflection element would no longer be displaceable. As the collision proceeds, the deflector is then also deformed or displaced, whereby the deflection element reaches around the front wheel from the outside and pivots it in.

However, the deflector with the extended deflection element also acts on the other vehicle involved in the collision: as a result of its alignment backward at an angle, it also pivots in the colliding front wheel of the other vehicle involved in the collision, whereby the two vehicles slide past one another. In this case, the decelerating forces acting on the two vehicles become significantly less and the transverse component of the impact force is reduced to such an extent that the colliding vehicles are deflected only very little from their traveling direction. This effect even occurs if the other vehicle involved in the collision is not equipped with the device according to the invention. It occurs all the more if it is also equipped with a deflector.

To achieve adequately rapid and reliable displacement of the deflection element, the deflector is a straight hollow profile and it forms an included angle of 40 to 70, preferably 45 to 60, angular degrees with the longitudinal beam. So, in spite of its guiding function, the deflector also remains adequately stiff.

In a preferred embodiment, in its rest position, the slider of the deflection element is located entirely inside the deflector and its operational position is determined by a stop on the deflector. As a result, in the case of a collision, the deflection element can be pushed out very far, but not too far, from the deflector.

In the preferred embodiment, furthermore, the deflector is a closed straight hollow profile, in the interior of which the slider is guided, which hollow profile has on its side that is visible from the front at least one slit, through which the forward projecting part is firmly connected to the slider, the slit forming the stop.

The deflector is preferably supported on a beam by means of a strut, the strut being dimensioned and supported in such a way that, when a certain impact force is reached, it deforms; that is to say buckles or is compressed.

In one possible embodiment, the part projecting forward from the deflection element is a shoulder, the location at which it is connected to the deflector being offset from the outer end of the latter toward the middle of the vehicle. It is for instance offset so far inward that the connecting location is somewhat in front of the front wheel. As a result, even the shoulder acts on the front wheel of the other vehicle involved in the collision. This is so in particular if the base of the shoulder is aligned such that, in the rest position and at the beginning of a collision, it is transverse to the traveling direction. The shoulder is preferably compressible, in order that the deformation of the slider is delayed in the case of a collision.

In another possible embodiment, the forward projecting part is a bracket, which is fastened to the outer end of the deflector and extends toward the middle of the vehicle, to approximately in front of the region of the front wheel. So, the deformation of the slider is delayed in a simple way. The bracket may, however, also be combined with the shoulder.

A further possibility is to design the forward projecting part of the deflection element as a push rod, which ends in front of or in the front cowling of the vehicle. So it reaches further forward and, in the case of a collision, will make the deflection element extend even earlier, whereby several hundredths of a second can be gained for the displacement of the deflection element, and the introduction of the impact force leading to the displacement is more favorable. So, the displacement of the deflection element is ensured even under the most unfavorable conditions.

If the front cowling (or the bumper) of the vehicle is strongly rounded, seen from above, the bumper is preferably fastened to the shoulder of the deflection element and its front end is closer to the middle of the vehicle than the shoulder of the deflection element.

The deflector may be firmly connected to the longitudinal beam of the vehicle and, if appropriate, supported on it with a strut. Then it deforms, along with the strut if present, as the collision proceeds. In a developed embodiment, the deflector is a link of a closed kinematic chain and, as a result, pivots backward under the effect of a frontal impact and is displaced toward the outer side of the vehicle. So, in the case of a collision, the guide of the deflection element and the deflection element itself are moved outward and toward the front wheel, and so reach further around it.

In this case, the effect of the deflection element on the front wheel of the other vehicle involved in the collision is also increased. As a result, the deflector can be made shorter, so that in the rest position it protrudes less far out to the side. That is a significant advantage because of the restricted space available in the front part of the chassis, and in particular in the case of vehicles with wide tires. Furthermore, it permits better allowance to be made for the design of the beams for fully overlapping frontal collisions. This is so because, in the event of a fully overlapping frontal collision, they are intended to buckle or be compressed in concertina fashion to increase the deformation distance.

Allowance is made particularly well for the restricted space conditions in the front part of the chassis if the kinematic chain is a slider-crank mechanism, which comprises the deflector, a rocker arm, which can pivot about a first bearing on the beam, and a pivoting-sliding guide for the deflector, the deflector being connected at a point between its outer end and the sliding guide to the rocker arm in an articulated manner. The pivoting-sliding guide allows pivoting and sliding displacement of the deflector. It may be variously formed, for example by guiding at a point, or at two points arranged symmetrically in relation to the direction of movement. The pivoting-sliding guide may, however, also be connected to a beam (longitudinal beam or transverse beam) by means of a pivot pin as a second bearing.

BRIEF DESCRIPTION OF THE DRAWINGS

The invention is described and explained below on the basis of illustrations, in which.

DETAILED DESCRIPTION

Figure 1:
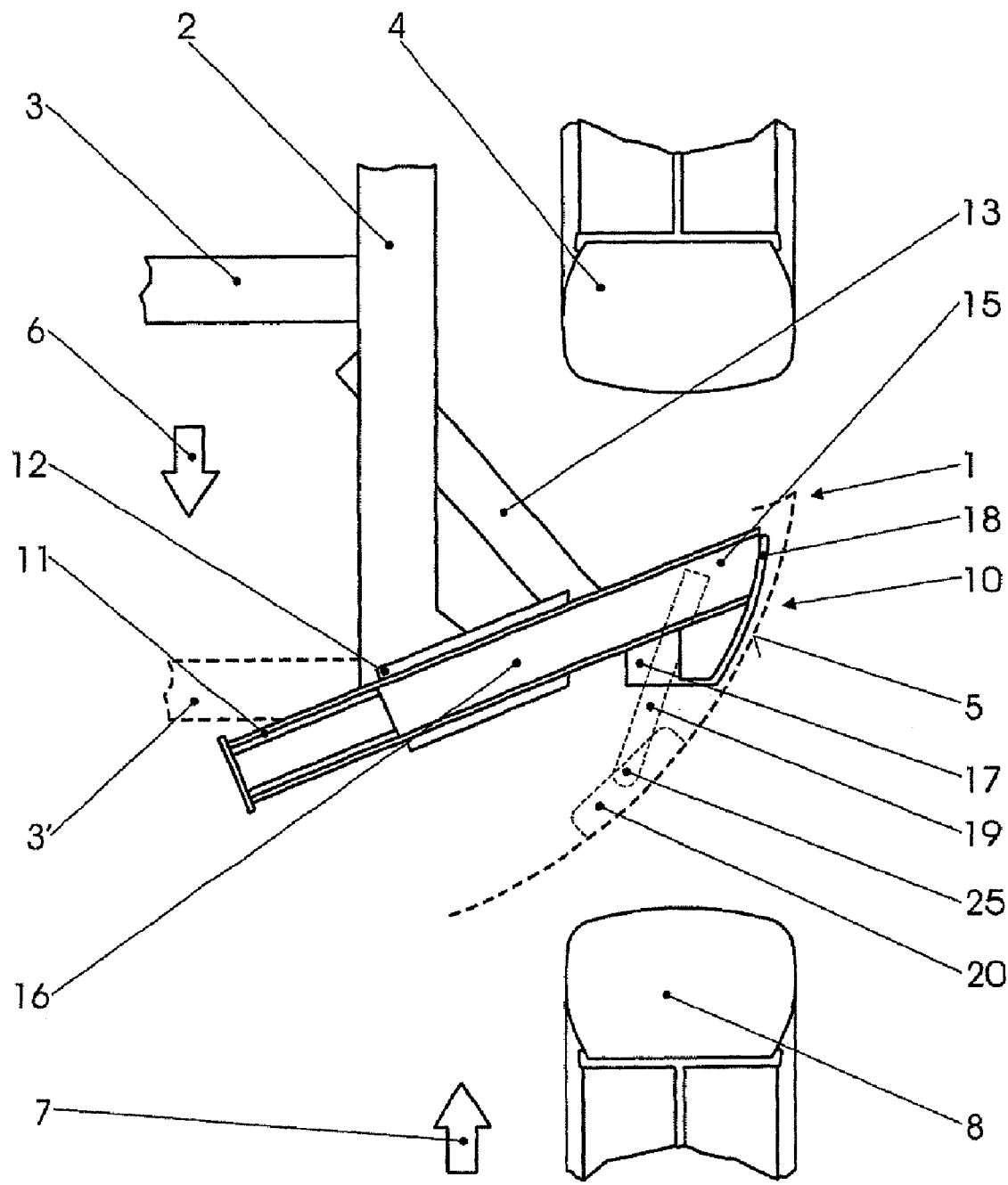
FIG. 1 shows the device according to the invention in a first embodiment.

In FIG. 1, the front part of the chassis of a motor vehicle 1 is only indicated by its left-hand longitudinal beam 2 with an adjoining transverse beam 3 or 3', by its left-hand front wheel 4 and (in dashed lines) by the contour of a front cowling 5. The right-hand side of the front part of the chassis cannot be seen, although it is generally formed in a mirror-symmetrical fashion. An arrow 6 indicates the traveling direction during forward travel. As far as another vehicle possibly involved with it in a collision is concerned, only the left-hand front wheel 8 and its direction of movement 7 are depicted. Since the vehicle 1 equipped according to the invention is to be protected in the event of an only partially overlapping frontal collision, the front wheels of the two vehicles that are respectively on the left move toward one another.

The deflector device according to the invention is designated as a whole by 10. It comprises a deflector 11, which is firmly connected to the longitudinal beam 2 by means of a collar 12, and a strut 13, which supports the deflector 11 in this angular position on the longitudinal beam 2. The support does not have to be on the longitudinal beam 2, it could also be on a transverse beam or some other part that is fixed to the vehicle. The deflector 11 forms an included angle of 40 to 70, preferably 45 to 60, angular degrees with the longitudinal beam and is a U-shaped profile, or better a closed straight profile, in which a deflection element 15 is guided displaceably in the longitudinal direction.

The deflection element 15 comprises a slider 16, which is displaceably guided on or in the deflector 11, and a shoulder 17, which projects forward in the traveling direction. The shoulder 17 is offset from the end of the deflection element 15 toward the middle of the vehicle and is connected here to the outer end of the deflection element 15 by a bracket 18. Under some circumstances, the bracket without the shoulder may be found to be sufficient. The shoulder 17 may be formed in such a way that, from a certain intensity of the impact acting on it, it is compressed or crushed. Furthermore, the deflection element 15 may have a push rod 19 (dashed lines) fastened to it, the front end 25 of which rod is closer to the middle of the vehicle and lies against the contour 5 of the inner cowling or has an impact part 20 flush with the contour 5.

Figure 2:
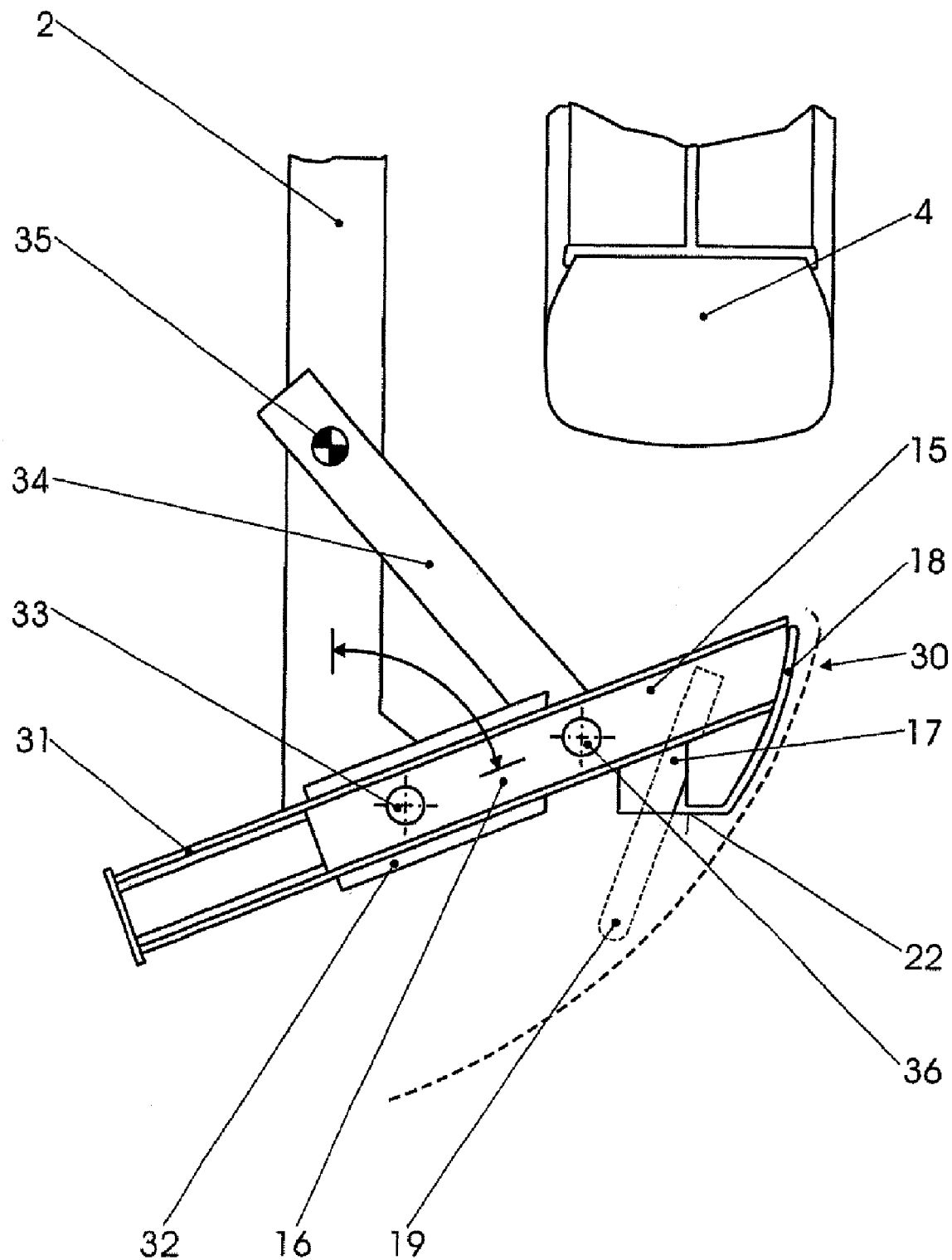
FIG. 2 shows the device according to the invention in a second embodiment.

The developed embodiment of FIG. 2 differs from that of FIG. 1 in that the deflector 31 of a deflector device designated generally by 30 is not firmly connected to the longitudinal beam 2 but is displaceable in a guide 32, which is pivotably connected here to the longitudinal beam 2 in a second bearing (or pivot pin) 33. It could, however, also be a guide that is fastened to a beam and also allows pivoting of the deflector. Instead of the strut of FIG. 1, provided here is a rocker arm 34, which is articulated on the longitudinal beam 2 in a first bearing (or pivot pin) 35 and is pivotably connected to the deflector 31 at a pivot point 36. Consequently, here the longitudinal beam 2, the pivoting-sliding guide 32, the deflector 31 and the rocker arm 34 form a closed kinematic chain, a slider-crank mechanism. However, the closed kinematic chain could also be an equivalent four-bar linkage.

The links of the kinematic chain are dimensioned in such a way that, in the case of a collision, after pushing out of the deflection element, the deflector 31 is displaced outward and the contour of the wheel 4 is approached. This movement, which takes place here in accordance with the kinematic chain, occurs in the simpler embodiment of FIG. 1 by deformation of the deflector and the strut. Again, as in the embodiment of FIG. 1, the deflection element 15 is displaceably guided in the deflector 31, as in FIG. 1, for which reason the same designations are chosen.

Figure 3:
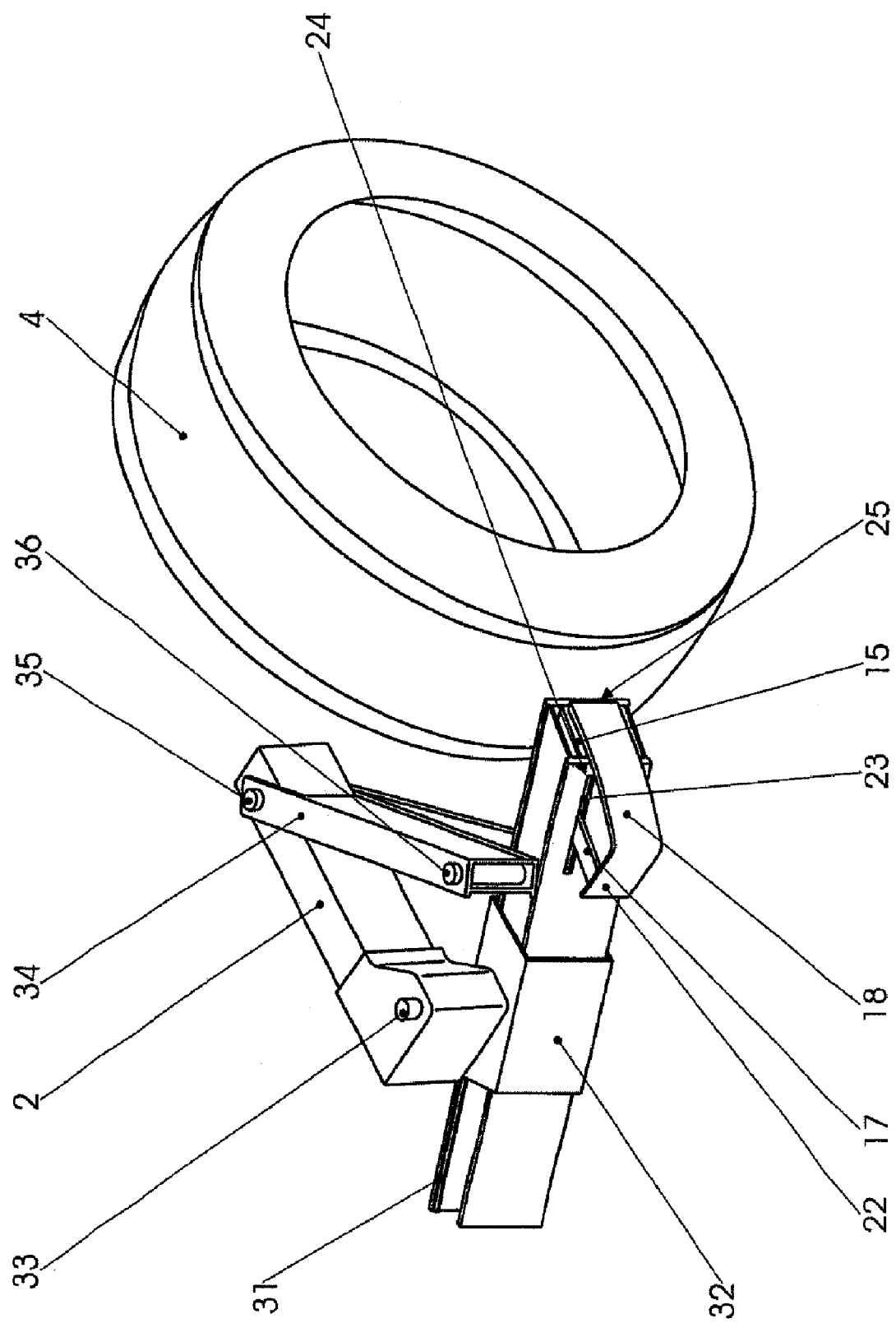
FIG. 3 shows the same as FIG. 2 in an axonometric view.

In FIG. 3, the device of FIG. 2 is represented three-dimensionally and graphically. It can be seen that the guide 32 of the deflector 31 and the bearing 33 formed here as a pivot pin are pivotable and the deflector 31 is displaceable in it the guide. Here, the deflector 31 is a closed profile, so that the slider 16 of the deflection element 15 is guided in the interior of the deflector 31. The shoulder 17 of the deflection element 15 is led out from the deflector 31 through one or more slits 23. The front delimitations of the slits form a stop 24, which limits the outward movement of the deflection element in the case of a collision. The end face 22 of the shoulder 17 lies in a plane normal to the longitudinal direction of the vehicle and, as bracket 18, reaches the outer end 25 of the deflector 31.

Figure 4:
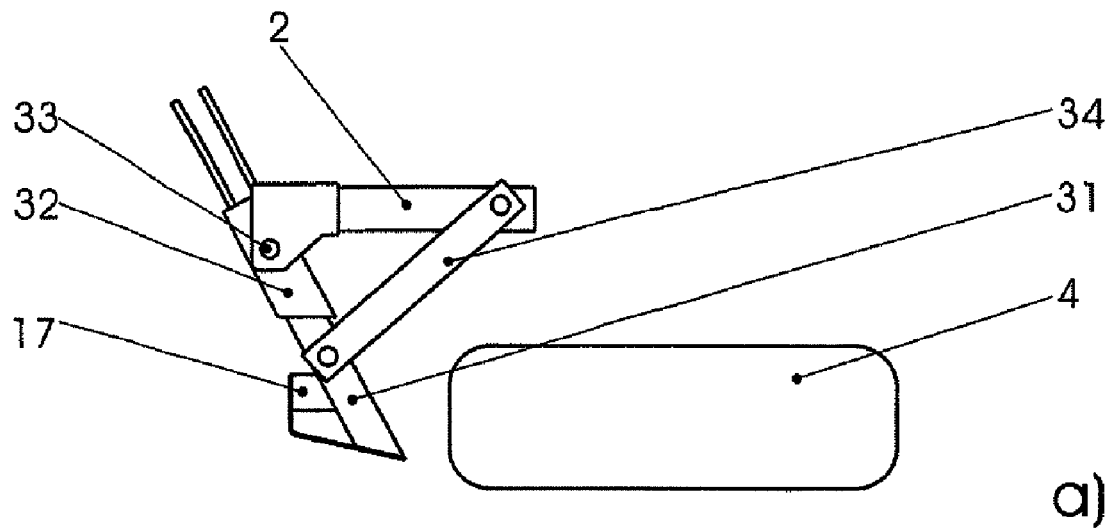
FIG. 4 shows the operating mode of the device according to FIG. 2 in three stages (a, b and c) of a collision.
Figure 4:
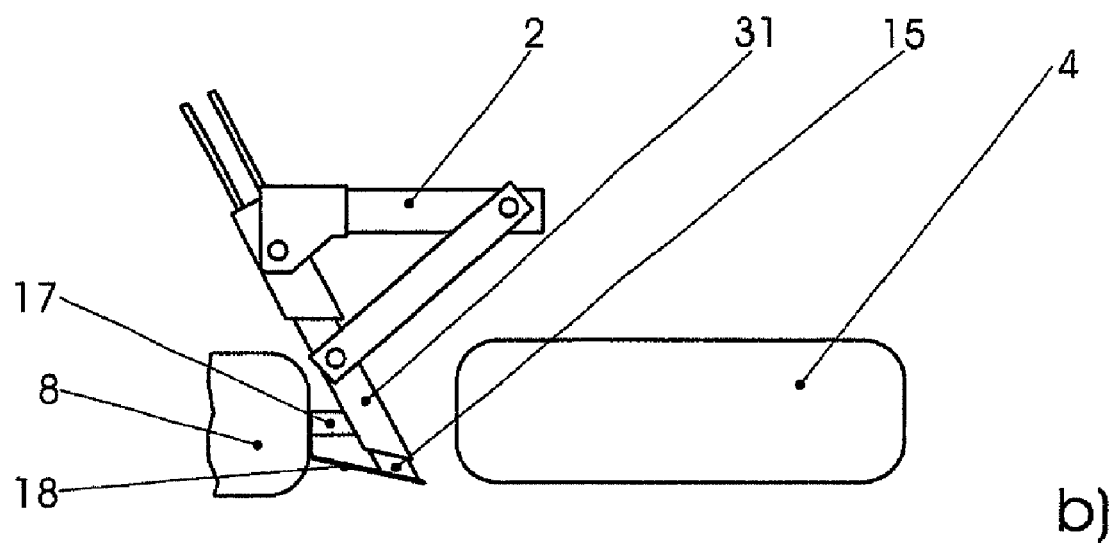
Figure 4:
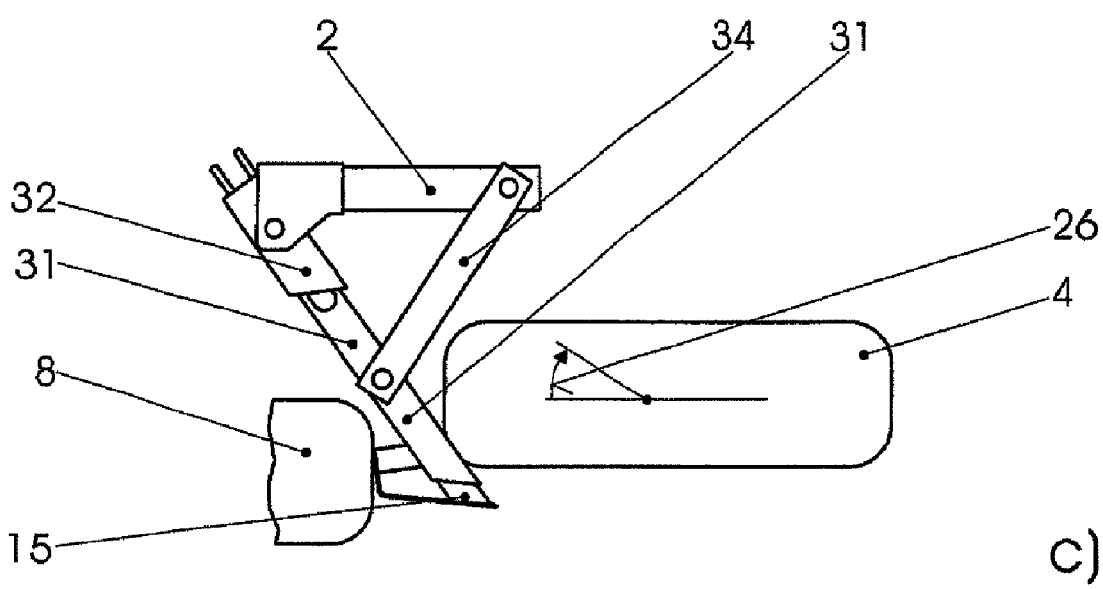

The operating mode of the device according to the invention is now explained on the basis of FIG. 4 in three phases of a collision. FIG. 4a is the state just before a partially overlapping frontal collision. The device is in the rest position. In this position, the slider 16 of the deflection element 15 is entirely inside the deflector 31. In FIG. 4b, the wheel of the other vehicle involved in the collision is just touching the shoulder 17 of the deflection element 15 and pushes the latter out as far as the stop 24 (see FIG. 3). In this stage, the shoulder 17 could also be compressed (which is not depicted), so that the deflector 31 already pivots.

In the next phase (FIG. 4c), the entire deflector 31 moves as part of the kinematic chain, or in the embodiment of FIG. 1 it is deformed, if appropriate together with the beam. The deflector 31 is pulled out in its guide 32 by the force still acting from the tire of the other vehicle involved in the collision and at the same time made to approach the wheel 4. In this position, the deflector 31 brings about an inward pivoting of the wheel 4, which is indicated by an arrow 26. It is expedient to make the area of contact of the deflector 31 with the tire of the wheel 4 as large as possible, in order to keep the vertical force exerted by the wheel on the deflector as small as possible. Alternatively, a wheel arch with a low friction coefficient could also be provided.

However, the deflector 31 also exerts the same inwardly pivoting effect on the wheel 8 of the other vehicle involved in the collision. This wheel is also pivoted in, in the same rotational sense, the two colliding wheels sliding past one another. As a result, the two wheels 4, 8 not only cannot become hooked, they also allow the colliding vehicles to scrape past one another without coming to a standstill and without being forced much off the roadway.

Even if the device according to the invention is described only for one front wheel or for one side of the vehicle, it will no doubt be present on both sides. It acts in fact not only in the case of a collision with an oncoming vehicle, but also in the case of a collision with a tree at the side of the road.

The invention claimed is:

1. A deflector device for a front part of a chassis of a motor vehicle which comprises beams, the deflector device arranged in front of a front wheel and formed by a deflector that is connected to a beam and projects in a substantially horizontal manner and backward at an angle to protect said front wheel in the case of a collision, characterized in that the deflector has a deflection element guided on it longitudinally displaceably from a rest position to an operational position, the deflection element comprising a slider, guided on or in the deflector, and a part protruding forward from said slider.

2. The deflector device as claimed in claim 1, wherein the deflector is a straight hollow profile and forms an included angle of 40 to 70 angular degrees with a longitudinal beam.

3. The deflector device as claimed in claim 1, wherein, in its rest position, the slider of the deflection element is located inside the deflector and its operational position is determined by a stop on the deflector.

4. The deflector device as claimed in claim 3, wherein the deflector is a closed straight hollow profile, in the interior of which the slider is guided, which hollow profile having on a side that is visible from the front at least one slit, through which the forward projecting part is firmly connected to the slider, the slit forming the stop.

5. The deflector device as claimed in claim 1, wherein the deflector is supported on a beam by means of a strut, which strut deforms when a certain impact force is reached.

6. The deflector device as claimed in claim 1, wherein the part projecting forward from the deflection element is a shoulder, which is offset from an outer end of the deflector toward the middle of the vehicle.

7. The deflector device as claimed in claim 6, wherein the shoulder of the deflection element is compressible.

8. The deflector device as claimed in claim 1, wherein the forward projecting part is a bracket, which is fastened to the outer end of the deflector and extends toward the middle of the vehicle, to approximately in front of the region of the front wheel.

9. The deflector device as claimed in claim 8, wherein the bracket reaches as far as a forward projecting shoulder, which is offset toward the middle of the vehicle from the outer end of the deflector.

10. The deflector device as claimed in claim 1, wherein the forward projecting part attached to the deflection element is a push rod, the front end of which is on or in the front cowling of the vehicle.

11. The deflector device as claimed in claim 10, wherein the push rod is fastened to the shoulder, the front end of the push rod being closer to the middle of the vehicle than the shoulder.

12. The deflector device as claimed in claim 10, wherein the pivoting-sliding guide is connected to the beam by means of a second bearing.

13. The deflector device as claimed in claim 1, wherein the deflector is a link of a closed kinematic chain and, as a result, pivots backward under the effect of a frontal impact and is displaced toward the outer side of the vehicle.

14. The deflector device as claimed in claim 13, wherein the kinematic chain is a slider-crank mechanism, which comprises the deflector, a rocker arm, which can pivot about a first bearing on the beam, and a pivoting-sliding guide for the deflector, the deflector being connected at a point between an outer end and the sliding guide to the rocker arm in an articulated manner.

* * * * *